(12) United States Patent
Zartman

(10) Patent No.: US 6,269,768 B1
(45) Date of Patent: Aug. 7, 2001

(54) ANIMAL MATTRESS

(76) Inventor: Thomas L. Zartman, 820 Hilltop Rd., Ephrata, PA (US) 17522

(*) Notice: Subject to any disclaimer, the term of this patent is extended or adjusted under 35 U.S.C. 154(b) by 0 days.

(21) Appl. No.: 09/477,122

(22) Filed: Dec. 31, 1999

(51) Int. Cl.[7] ............................................. A01K 29/00
(52) U.S. Cl. ............................................. 119/28.5
(58) Field of Search ...................... 5/690, 948, 952, 5/953, 420, 702, 699, 656; 119/28.5

(56) References Cited

U.S. PATENT DOCUMENTS

| 5,226,384 | 7/1993 | Jordan | 119/28.5 |
|---|---|---|---|
| 5,265,558 | 11/1993 | Schonrock | 119/28.5 |
| 5,653,195 | 8/1997 | Young | 119/526 |
| 5,724,917 | 3/1998 | Dodson et al. | 119/526 |

OTHER PUBLICATIONS

Journal of Waste Recycling (IBIC) Funding innovative uses for scrap tires v40 n3, p61–63, p. 3.*

* cited by examiner

Primary Examiner—Thomas Price
(74) Attorney, Agent, or Firm—Martin Fruitman

(57) ABSTRACT

The apparatus is an animal mattress. One embodiment is a pad made from a relatively loose pack of long particle recycled tire rubber bonded together with a polymer. The spaces between the particles provide compressibility and resiliency. The pad has corrugations on the bottom, a flat top, and is covered by a waterproof polymer fabric cover when installed. A second embodiment uses fine particles which are more tightly packed. The central section of its bottom surface is undercut to form an inverted pan-like structure. The pan sides form a support frame, and a pattern of pillars is located within the pan so that the flat top is supported but compressible.

12 Claims, 3 Drawing Sheets

ANIMAL MATTRESS

BACKGROUND OF THE INVENTION

This invention deals generally with animal beds and more specifically with a preformed farm animal mattress molded into a pad to cover the floor of a stall.

It is well understood that cows prefer to lie down after eating, and modern dairy barns which have concrete floors tend to make it uncomfortable for cows to do so. There have been many approaches to make the cows more comfortable, the simplest of which is to spread loose cushioning material, such as straw, on the floors of the stalls. Such loose material is, however, a significant problem because it is easily displaced by the cow's movements. That leads to the loose material not only being moved from the location where the cow will lie upon it, but also spreading it around the rest of the barn from where it must be collected and disposed of.

Several proposed solutions to this problem have been patented. U.S. Pat. No. 5,653,195 by Young discloses a mattress which resembles the classic air mattress with multiple separate parallel tubes formed from fabric, with the tubes filled with shredded rubber from vehicle tires and with a fabric blanket covering the mattress. The top blanket has one end attached to the stall's brisket board, and the other end attached to the stall's keeper board. U.S. Pat. No. 5,724,917 by Dodson et al describes an animal mattress of very similar structure to that of Young, except the tubes are constructed of double woven fabric and the web between the tubes is single woven.

The problem with such mattresses is that, because they are filled with loose material, any puncture of the mattress leads to loss of the loose material from the mattress, and dispersal of the loose material throughout the barn.

It would be very beneficial to have an animal pad which did not include loose material, and which would still be resilient enough to afford the desirable comfort for cows.

SUMMARY OF THE INVENTION

The present invention furnishes an animal mattress which does not include any loose material which might be lost and dispersed. One embodiment of the invention is a one piece molded pad with a smooth top surface and a corrugated bottom surface. The pad is molded from recycled tire rubber chopped into relatively long particle sizes with the particles held together with a polymer bonding agent. The sizes of the spaces between the particles are determined by the size of the particles, and the spaces among the particles determine the resiliency of the entire pad.

A second embodiment of the invention is a pad molded of fine particles which are more tightly packed to give the material greater strength. The higher density of this material makes it less resilient than the material of the long particle pad, but the external configuration of the pad of the second embodiment is constructed to add resiliency and furnish overall characteristics appropriate for use as a mattress for cows.

The fine particle pad has sections with two different thicknesses. The edge sections of the pad are thicker sections formed of compressed particles which essentially form a frame around the rest of the pad. The central portion of the pad, the section surrounded by the edge sections, is not as thick as the edge sections. However, since the top surface of the pad is flat, the smaller thickness results in the center section being suspended above the bottom of the edge sections.

Actually, it is easier to understand the structure when it is viewed upside down. The fine particle pad then appears as a shallow pan with thick sidewalls, and to properly support the animal while controlling the overall resiliency of the pad, the interior of the "pan" includes many pillars which extend from the bottom of the "pan" to the plane determined by the sidewalls.

Each embodiment of the invention thereby furnishes a one piece animal mattress which is simple to install and can provide the resiliency desired for the animal, but neither embodiment will, even if punctured, disperse particulate matter or lose its essential resiliency and thickness.

DETAILED DESCRIPTION OF THE INVENTION

Figure 1:
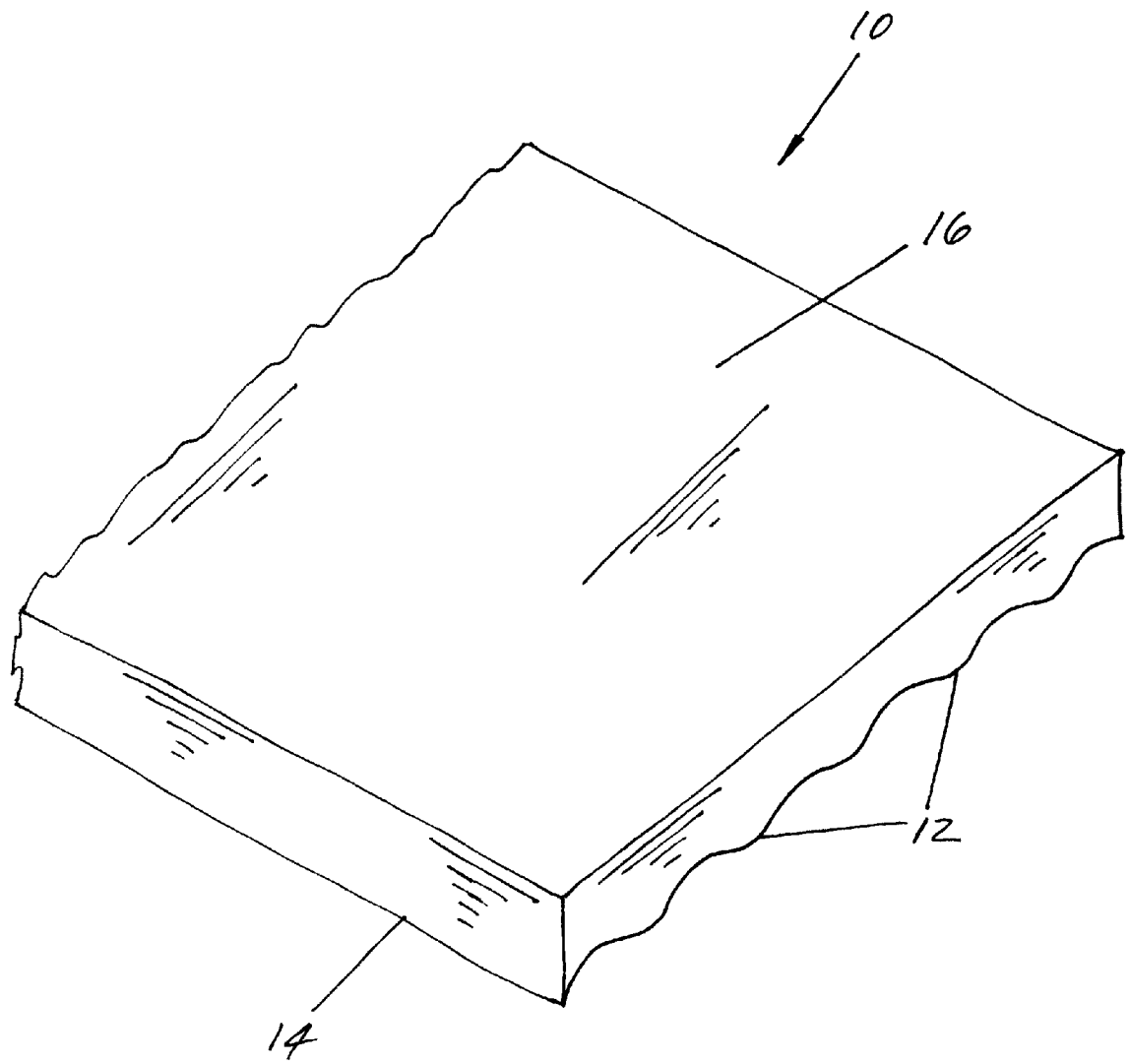
FIG. 1 is a perspective partial top view of one embodiment of the invention with a corrugated bottom surface.

FIG. 1 is a perspective partial top view of one embodiment 10 of the animal mattress of the invention. Mattress 10 is constructed with corrugations 12 along its bottom surface 14 while its top surface 16 is flat. The corrugations provide added resiliency which otherwise depends upon the material used in the essentially flat pad.

Corrugated mattress 10 is constructed of recycled automobile tire rubber of a relatively long grain size. The particles used are particles recycled from a particular tire retreading process in which the tread portion of used tires is removed by blades so that the end result is long cut tread flakes. These flakes are then bonded into a relatively loose pack using a polymer bonding agent such as the polyurethane binder sold by Marchem Corporation under the designation MISTABOND H-3016. In the typical cow mattress the amount of binder used is no more than twelve percent by weight of the entire pad.

The resulting loose pack mattress is best defined by the density of the material in the finished mattress, which was determined by experimentation with actual animals, and for the embodiment of FIG. 1 the densty is 30 pounds per square foot (0.48 grams per cubic centimeter). The practical range of density for satisfactory resiliency in such an animal mattress is between 23 and 40 pounds per cubic foot. The loose pack of the long cut tread flakes provides for significant spacing between the particles of rubber, and thus provides the actual resiliency of the mattress, which is indicated by a ¼ to ⅜ inch compression of the mattress when a 5 inch diameter plate loaded with 300 to 500 pounds is placed on the mattress. The size of the plate and the weight used is a fair representation of the actual effect of cows stepping on the mattress. Such resiliency is quite similar to that which a cow experiences from the ground in a pasture, and thus accomplishes the goal of the invention. For the embodiment of mattress 10 of FIG. 1 with such resiliency, the mattress dimensions are 4 feet wide by 5½ feet long by 3 inches thick, and the entire mattress weighs 165 pounds. The bottom corrugations are one-half inch deep and they are spaced 3 inches apart.

Figure 2:
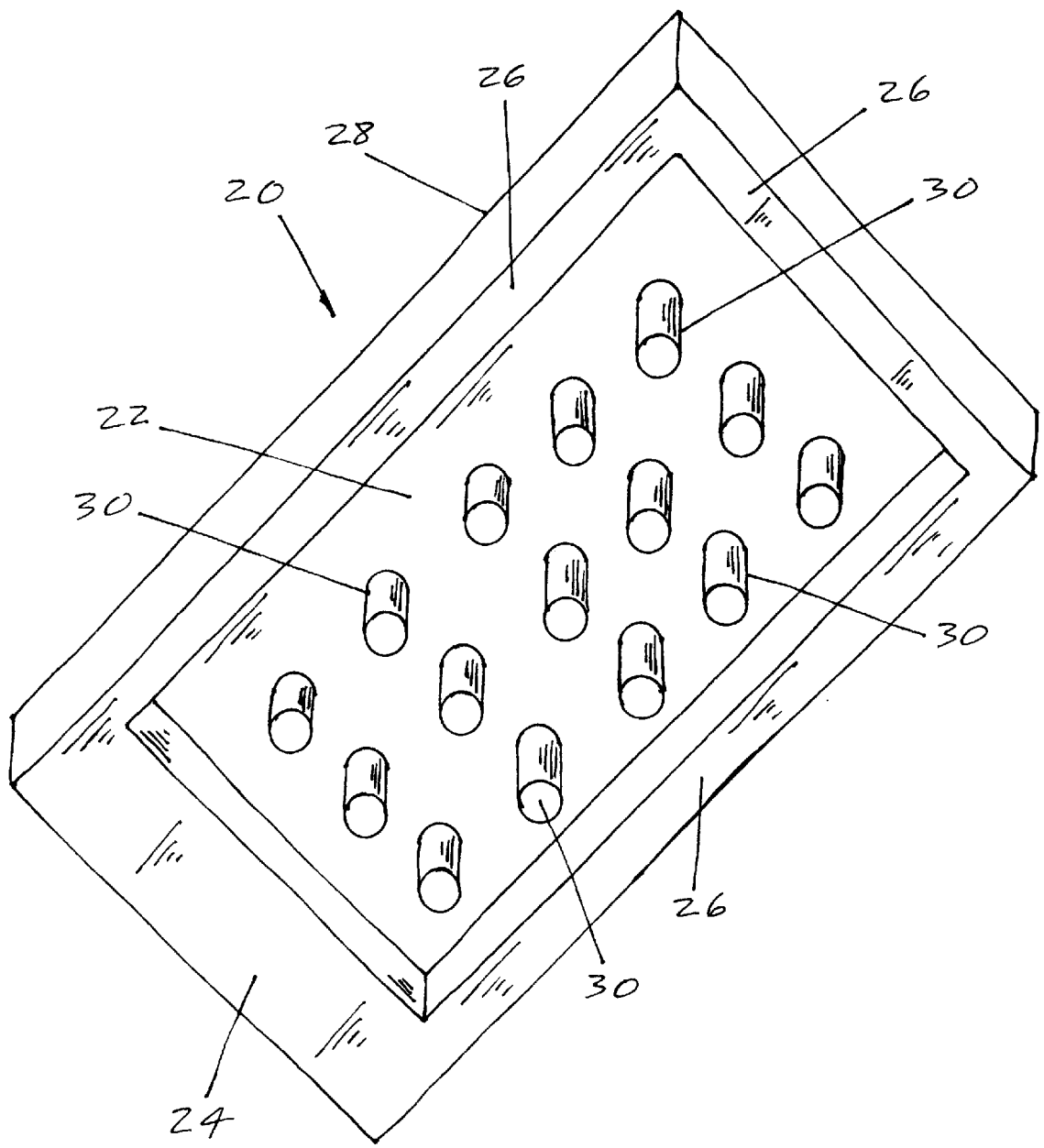
FIG. 2 is a perspective bottom view of a second embodiment of the invention which includes a center section which is thinner than the surrounding edge sections.

FIG. 2 is a perspective bottom view of animal mattress 20 of a second embodiment of the invention which includes central section 22 which is thinner than surrounding edge sections 24 and 26. Mattress 20 is also constructed of recycled automobile tire rubber, but it is of a relatively fine grain size, and is highly compressed and bonded with polyurethane to yield a very strong material which resists damage. The material used for this embodiment is those particles which result from the buffing process used on the casings of tires as they are being retreaded. The mattress is then formed under high compression which results in a stiff pad with low resiliency, so the resiliency must then be derived not from the material itself, but from the structure of the pad, which is described below.

The resulting finished mattress has a density of 45 pounds per cubic foot (0.72 grams per cubic centimeter). This compressed material provides for significantly less spacing between the particles of rubber than the embodiment of FIG. 1, and therefore provides less resiliency. The resiliency can be measured in the same manner as is described above, and the material used in the embodiment of FIG. 2 compresses 1/64 to 1/32 of an inch when a 5 inch diameter plate loaded with 300 to 500 pounds is placed on a 2 inch thick mattress.

With the decreased resiliency of the material used for mattress 20 of FIG. 2, the resiliency of the mattress is furnished by a structure which differs from the simple corrugated pad shown in FIG. 1. The basic structure of mattress 20 is of an inverted pan, so that edge sections 24 and 26 are thicker than central section 22, and the edge sections support central section 22 above a stall floor when mattress 20 is placed flat upon the floor with planar surface 28 facing up.

Of course, although central section 22 is stiff enough to support itself above the floor, it can not also support the weight of a cow. Pillars 30 are therefore formed during the molding of mattress 20. Pillars 30 extend from the surface of central section 22 to the plane determined by the surfaces of edge sections 24 and 26. That is, their length is equal to the difference in thickness between central section 22 and end sections 24 and 26. Thus, pillars 30 actually support central section 22 and the weight of a cow upon it. The resiliency of mattress 20 can then be controlled by the diameters of pillars 30 and the number of pillars which are formed upon central section 22.

In the embodiment of mattress 20 shown in FIG. 2, the exterior dimensions of the mattress are 4 feet by 6 feet by 2 inches thick, but the mattress can also be made only 1½ inch thick. In the 2 inch thick version, central "pan" section 22 is 3½ feet by 5 feet and ¾ inches thick. Pillars 30 are then 1¼ inches high and 1½ inches in diameter, with 2 1/12 inches between pillars and a total of approximately 150 pillars within the "pan".

Another feature of mattress 20 is the ease of adjusting its length. Edge section 24 is constructed with extra length of 6 inches in the embodiment of FIG. 2. Thus, a significant portion of edge section 24 can be cut off to shorten mattress 20 while still providing the necessary support for central section 22.

Regardless of which of the mattress embodiments is being used, it is advisable to use a protective covering over the mattress to prevent its saturation with cow urine. For this purpose a waterproof polymer top cover is used. This cover is a standard product sold as a cow mattress cover, is typically 1/8–1/4 inch thick, and is specified as a 40–50 ounce cover. An 80 ounce cover is also available.

Figure 3:
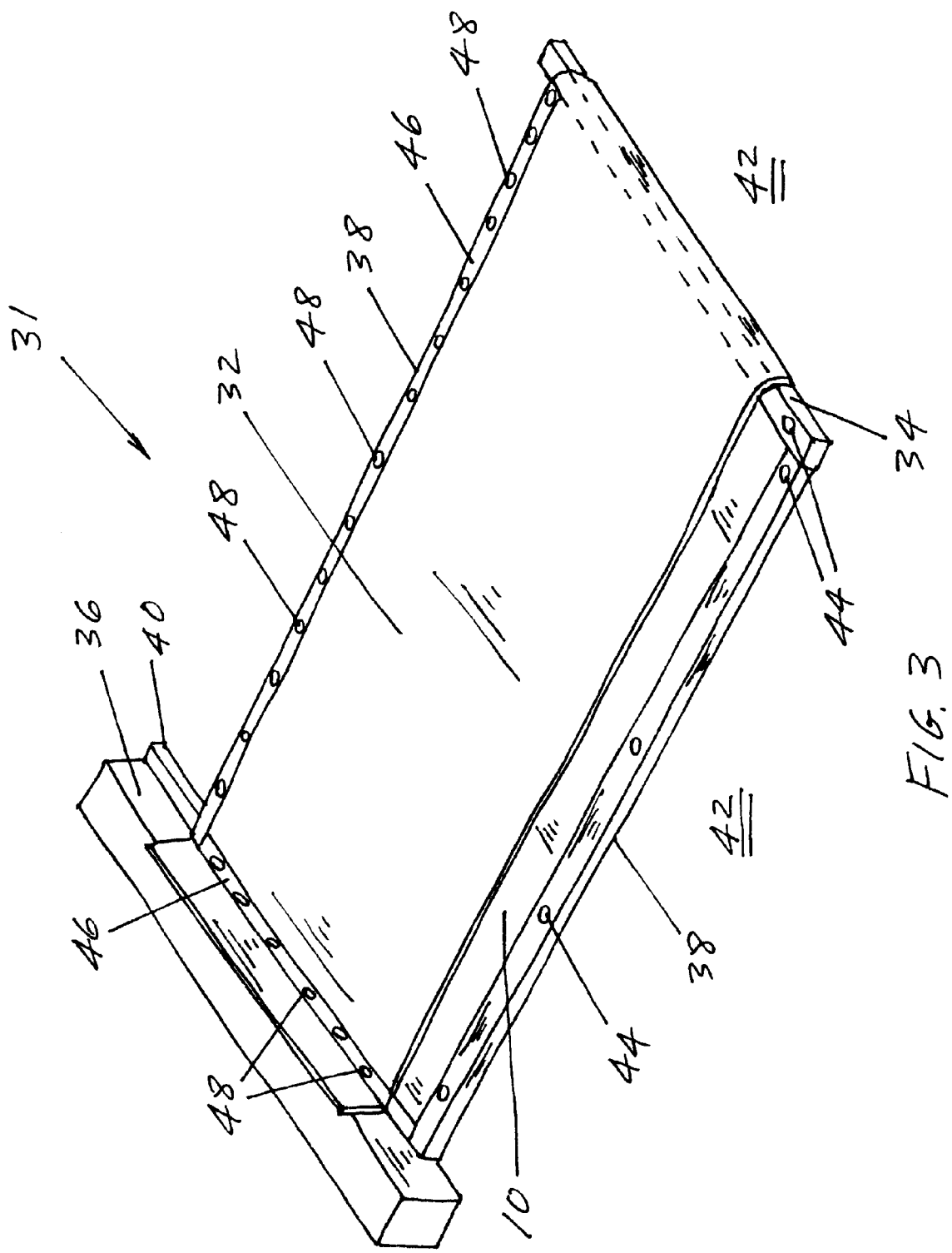
FIG. 3 is a perspective view of the invention as it is installed within an animal stall.

FIG. 3 is a perspective view of the invention shown as it is installed within animal stall 31 using protective cover 32 which is shown with one side edge cut away to expose the structure used in the installation. It is typical for a cow stall to have keeper board 34 at the open end of the stall and brisket board 36 at the head end of the stall. However, installation of the mattresses of the present invention are facilitated by the use of additional side boards 38 between the brisket board 36 and keeper board 34. Since in many installations brisket board is actually a concrete beam cast onto the stall floor, anchor board 40 is also installed next to brisket board 36 on floor 42 of stall 31. Keeper board 34, side boards 38, and anchor board 40 thereby form a shallow tray which captures mattress 10 (or mattress 20) and keeps it from sliding out of the stall.

Keeper board 34, side boards 38, and anchor board 40 also furnish the means by which protective cover 32 is anchored down to cover mattress 10. All of these boards are attached to concrete stall floor 42 by conventional bolts 44. However, cover 32 is captured between keeper board 34 and stall floor 42 as keeper board 34 is being installed on the floor. Thus, when cover 32 is pulled across mattress 10, cover 32 wraps around keeper board 34. With cover 32 drawn tightly across mattress 10, reinforcing strips 46 are placed at the edges of cover 32 and nails 48 are driven into side boards 38 and anchor board 40 through reinforcing strips 46 and cover 32. Furthermore, all of these boards are sized so that their heights are less than the thickness of the mattress which they enclose. These lower heights of the side boards and the anchor board protect the mattress cover from stress, because when a cow steps on the cover near one of these boards the compression of the mattress actually loosens the cover slightly. In the prior art, when for instance, a cover was attached high on a brisket board, the weight of a cow on the nearby mattress edge stresses the cover by stretching it.

The mattress is thereby completely restrained, covered, and protected, and since the mattress itself is a single molded part, it can remain in service for an unlimited time without any maintenance.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other pillar sizes and spacings may be used in mattress 20, the resiliency and sizes of either mattress embodiment can be adjusted for various animals, and fine grain material can also be used in the corrugated mattress of FIG. 1.

What is claimed as new and for which Letters patent of the United States are desired to be secured is:

1. An animal mattress comprising a pad molded of particles of automobile tire rubber and a bonding agent to hold the particles together, with the size of the particles and the spacing between the particles adjusted to determine the resiliency of the pad wherein the particles are long cut tread flakes recycled from a process in which blades remove only the tread portion of tires.

2. The mattress of claim 1 wherein one surface of the pad has corrugations.

3. The mattress of claim 1 wherein the bonding agent is polyurethane and the ratio of bonding agent in the pad is no more than 12 percent by weight.

4. The mattress of claim 1 wherein the pad is at least 1½ inches thick.

5. An animal mattress comprising a pad molded of particles of automobile tire rubber and a bonding agent to hold the particles together, with the size of the particles and the spacing between the particles adjusted to determine the resiliency of the pad wherein one surface of the pad is flat, the central section of the pad is thinner than the edge sections, and pillars within the central section extend from the surface of the central section to the height of the edge sections.

6. The mattress of claim 5 wherein the size of the pillars is adjusted to determine the resiliency of the pad.

7. The mattress of claim 5 wherein the spacing between the pillars is adjusted to determine the resiliency of the pad.

8. The mattress of claim 5 wherein one edge section is longer than the opposite edge section and the longer edge section can be trimmed to adjust the size of the pad.

9. The mattress of claim 1 wherein the density of the material in the finished mattress is between 23 and 45 pounds per cubic foot.

10. An animal mattress comprising a pad molded of particles of automobile tire rubber and a bonding agent to hold the particles together, with the pad installed on a stall floor between the head end of the stall, a keeper board at the open end of the stall, and side boards, with the keeper board and the side boards attached to the stall floor, and a protective cover installed on top of the pad by fastening the cover to the keeper board and the side boards with the pad captured between the keeper board and the stall floor and the cover wrapped around the keeper board.

11. The mattress of claim 10 further including an anchor board attached to the stall floor adjacent to the head end of the stall, with the height of the anchor board less than the thickness of the mattress, and the protective cover fastened to the anchor board.

12. The mattress of claim 10 wherein the heights of the sideboards are less than the thickness of the mattress.

* * * * *